H. MOORE.
Improvement in Rotary Grain-Separators.

No. 131,771.   Patented Oct. 1, 1872.

Witnesses.   Inventor.

2 Sheets--Sheet 2.
H. MOORE.
Improvement in Rotary Grain-Separators.
No. 131,771. Patented Oct. 1, 1872.
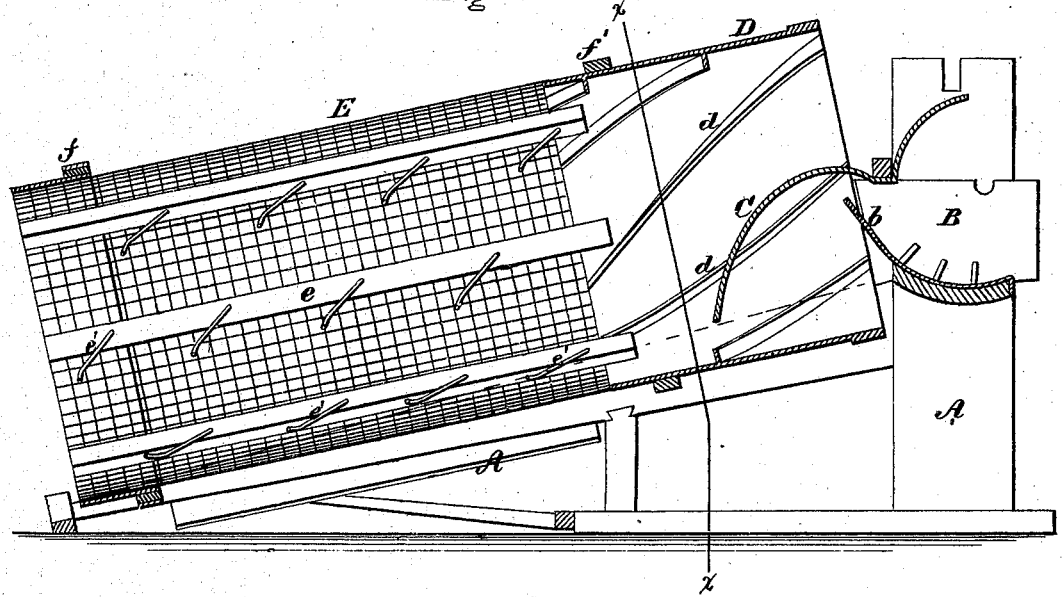
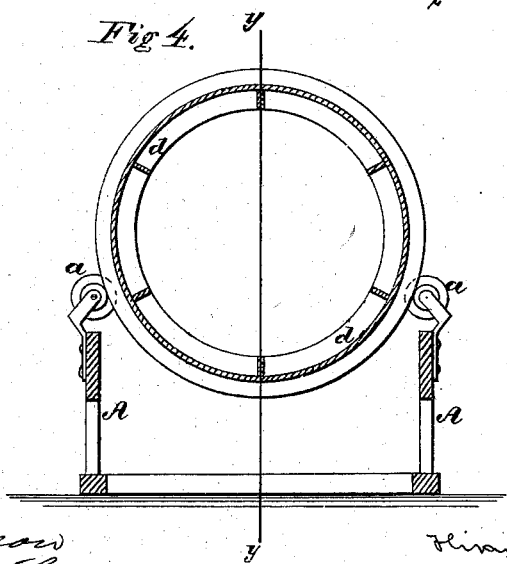

UNITED STATES PATENT OFFICE.

HIRAM MOORE, OF GREEN LAKE, WISCONSIN.

IMPROVEMENT IN ROTARY GRAIN-SEPARATORS.

Specification forming part of Letters Patent No. 131,771, dated October 1, 1872.

*To all whom it may concern:*

Be it known that I, HIRAM MOORE, of the town and county of Green Lake, in the State of Wisconsin, have invented certain Improvements in Grain-Separators, of which the following is a specification:

My invention relates to that class of grain-separators in which the grain and straw pass directly from the thrashing-cylinder to a revolving screen; and my improvements consist, first, in interposing between the thrashing-concave and screen a deflector, to prevent the grain and straw from being shot directly through the screen by the high velocity imparted by the thrashing-cylinder; second, in constructing the end of the screen nearest the concave of imperforated sheet metal, or with a continuous surface, to prevent the deflected grain and straw from passing directly through the walls of the screen; third, in constructing spiral flanges on the interior of the sheet-metal screen, to convey the straw and grain away from its place of deposit by the deflector, thus preventing choking, and securing the deposit of the grain in proper relation to the screen; fourth, in combining a deflector, a solid-walled spiral cylinder on which the grain is deflected, and a revolving screen, as hereinafter more fully set forth; fifth, in combining with a reticulated revolving screen longitudinal troughs to carry the grain over to the side of the screen opposite that on which the straw is rising and drop it; sixth, in combining with the revolving screen longitudinal troughs to carry over the grain, and wires helically inclined and projecting into the cylinder to feed on the straw rapidly and separate it from the grain; seventh, in mounting the screen on friction-rollers, and driving it by means of a band passing around the screen and around two pulleys mounted on parallel shafts geared together, one being the driving-shaft, by which means lightness, cheapness, and efficiency are secured.

In the accompanying drawing, all my improvements are shown as embodied in one machine; obviously, however, some of them may be used without the others.

Figure 1:
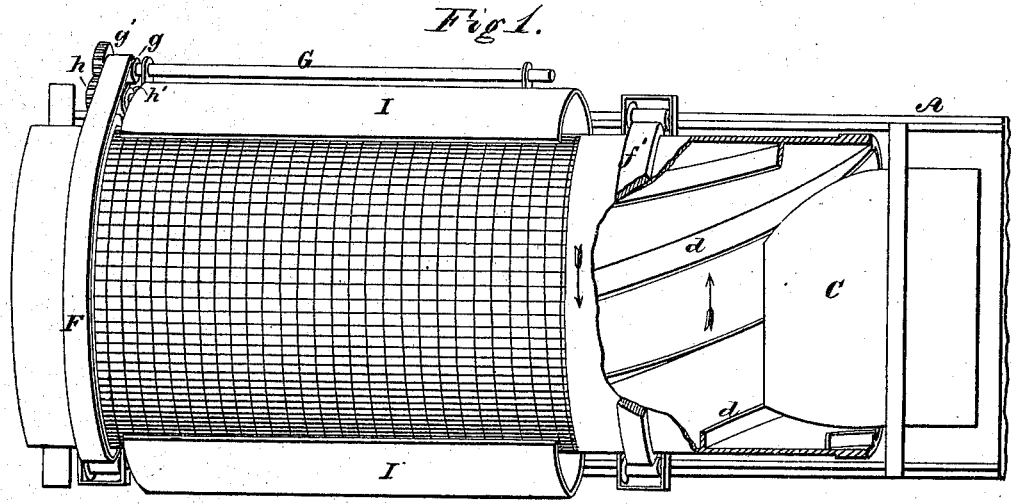
Figure 2:
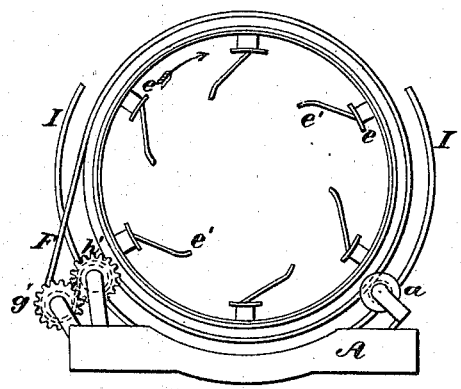

Figure 1 is a plan view of so much of my improved separator as is necessary to illustrate my invention, with portions of the solid-walled or continuous-surfaced cylinder broken away; Fig. 2, a rear view; Fig. 3, a longitudinal section on the line $y\, y$ of Fig. 4; and Fig. 4, a transverse section on the line $x\, x$ of Fig. 3.

A stout frame, A, supports the mechanism. A thrashing-cylinder, of any suitable well-known construction, is mounted in a concave, B, and driven in well-known ways. From this concave the grain and straw escape through the mouth $b$. Instead of being allowed to shoot directly into the screen, a deflector, C, catches the grain and straw and deflects them against the walls of the solid portion D of a cylindrical screen, by preference formed of sheet metal. The screen is mounted on an axis inclined slightly from the concave downward, and revolved by means hereinafter described. Were the inner surface of the screen smooth the grain and straw might slip, and fail to feed with sufficient rapidity to clear the mouth of the deflector. To prevent this I construct spiral ribs or flanges $d$ on the interior of the solid portion of the screen, which carry away the straw and grain laterally, as well as longitudinally, and drop them upon the lower edge of the sheet-metal cylinder D. The deflector is cut away on the side toward which the grain is carried, as shown in Fig. 1, to prevent the straw catching at that point. By the continuous revolution of the screen the grain is fed over the reticulated screen E, by preference of wire-gauze. Were this cylinder smooth internally the tendency would be to discharge the straw in the form of a twisted rope with much grain entangled therein; to prevent this I form longitudinal troughs $e$ in the interior of the screen to scoop up the grain, carry it over the straw, and drop it upon the clear side—the descending one—of the screen. Still more effectually to separate the straw and grain I arrange wires $e'$ helically around the interior of the cylinder and projecting inward. These wires catch and stir up the straw and force it out of the lower end of the screen. I mount the screen, by preference, on friction-rollers $a$ on the frame; ribs $f f'$ on the cylinder run on these rollers. A shaft, G, driven from any suitable prime mover, carries a pulley, $g$, and spur-pinion $g'$, the latter driving a corresponding pinion, $h$, on a shaft carrying a pulley, $h'$. A driving-band, F, encircling the screen, passes partly around the pulley $g$ and over the pulley $h'$. I thus secure ample frictional contact to drive the screen with a steady motion, and avoid the use of a gear-ring on the screen, which is heavy and expensive. Shields I prevent the grain from escaping laterally, and conduct it to an apron under the screen, (not shown in the drawing,) which apron conveys it to a suitable winnower.

I claim as my invention—

1. The deflector interposed between the thrashing-concave and revolving screen, as and for the purpose set forth.

2. The combination of the thrashing-concave, the deflector, and the revolving solid-walled cylinder, against the walls of which the grain and straw are deflected, substantially as set forth.

3. The combination of the deflector, the revolving solid-walled cylinder, and the spiral ribs to feed the grain and straw to the reticulated screen, substantially as set forth.

4. The combination of the deflector, the solid-walled spirally-ribbed cylinder, and the revolving reticulated screen, all these members being constructed and operating substantially as set forth.

5. The combination of the revolving reticulated screen with its internal elevating-troughs, substantially as set forth.

6. The combination of the revolving reticulated screen, the troughs for elevating the grain, and its inclined wires acting on the straw to separate the straw and grain, substantially as set forth.

7. The combination of the revolving screen mounted on friction-rollers, two geared pulleys on parallel shafts, and a driving-band encircling the screen and passing over both pulleys, substantially as set forth.

In testimony whereof I have hereunto subscribed my name.

HIRAM MOORE.

Witnesses:
JOSEPH I. PEYTON,
BALTIS DE LONG.